United States Patent [19]

Francois et al.

[11] Patent Number: 6,018,582
[45] Date of Patent: Jan. 25, 2000

[54] OPTICAL TRANSMISSION SYSTEM IMPLEMENTING ENCRYPTING BY DETERMINISTIC CHAOS

[75] Inventors: Pierre-Luc Francois, Lannion; Jean-Pierre Goedgebuer, Pouilley-les-Vignes; Laurent Larger, Besancon; Henri Porte, Serre-les-Sapins, all of France

[73] Assignee: France Telecom, Paris, France

[21] Appl. No.: 08/779,257

[22] Filed: Jan. 3, 1997

[30] Foreign Application Priority Data

Jan. 5, 1996 [FR] France ................................. 96 00084

[51] Int. Cl.$^7$ ........................................................ H04L 9/00
[52] U.S. Cl. ................................................. 380/49; 380/48
[58] Field of Search ............................... 380/48, 49, 21; 364/713, 717; 395/200.66; 382/249, 209, 233; 356/5.01, 73; 235/472; 385/133, 33; 89/1.11; 359/154

[56] References Cited

U.S. PATENT DOCUMENTS

| | | | |
|---|---|---|---|
| 5,412,730 | 5/1995 | Jones | 380/46 |
| 5,777,778 | 7/1998 | Yao | 359/245 |

OTHER PUBLICATIONS

IEEE Transactions on Circuits and Systems, vol. 42, No. 8, Aug. 1, 1995, pp. 455–463.
Phys. Rev. Lett., vol. 70, No. 20, pp. 3031–3034.
IEEE Journal of Quantum Electronics, vol. 30, No. 2, 1994, p. 334–339.
Optics Communications, vol. 30, No. 2, Aug. 1979, pp. 257–261.
Physical Review Letters, vol. 64, No. 11, Mar. 12, 1990, pp. 1196–1199.
SPIE, vol. 2038, 1993, pp. 115–130.
Physical Review Letters, vol. 64, No. 8, Feb. 19, 1990, pp. 821–824.
Physical Review A, vol. 25, No. 4, Apr. 1982, pp. 2172–2182.
Electronics Letters, Jul. 21, 1994, UK, vol. 30, No. 15, pp. 1203–1204.
SPIE, vol. 2038, pp. 2–25, 1993.

*Primary Examiner*—Gail O. Hayes
*Assistant Examiner*—Ho S. Song
*Attorney, Agent, or Firm*—Blakely Sokoloff Taylor & Zafman

[57] ABSTRACT

The invention relates to an optical transmission system that implements encrypting of an information carrying signal by deterministic chaos. The system includes a transmitter (1), a receiver (4), and one transmission channel coupled between the transmitter (1) and the receiver (4). The transmitter (1) includes a deterministic chaos generator (3) coupled to an encoding system (2). The deterministic chaos generator (3) includes a wavelength tunable laser-emitting diode (33) and a feedback loop (34). The active layer of laser diode (33) is offset controlled by a laser signal passed through a non-linear optical element (32) and a delay line (31). The receiver (4) has a deterministic chaos generator (7) coupled to a synchronizer (6) and a decoder coupled to the synchronizer (6). Preferably, chaos generator (3) is the same as chaos generator (7). Other features are disclosed.

15 Claims, 4 Drawing Sheets

OPTICAL TRANSMISSION SYSTEM IMPLEMENTING ENCRYPTING BY DETERMINISTIC CHAOS

BACKGROUND OF THE INVENTION

1. Field of the Invention

The present invention relates to optical transmission systems implementing encrypting by deterministic chaos.

2. Background Information

The very fast progress of telecommunications systems using the public optical fiber network is being accompanied by said network carrying traffic constituted by information of a private or commercial kind. It is therefore essential to have encoding means for protecting such information when it is for selective distribution. In general, signals are encrypted using highly specific codes generated by mathematical algorithms. Such methods are reserved for signals that possess a high degree of confidentiality, but they suffer from the drawback, due to their complexity with respect to encoding and decoding, of being suitable for use only at relatively low transmission rates (a few tens of Kbit/s approximately). Some applications, such as remote distribution of paid-for information or TV channels, for example, can accept a much lower degree of security, providing it is nevertheless capable of providing protection against intruders possessing ordinary detection means. Under such circumstances, the requirements are for an encrypting device that is cheap, reliable, simply reconfigurable by quickly changing the encrypting key, and capable of accommodating high data rates.

The proposed apparatus sets out to satisfy these requirements.

Proposals have already been made to use deterministic chaos phenomena for encrypting radiofrequency communications.

In this respect, reference may advantageously be made to the following publications:

[1] L. Pecora, "Overview of chaos and communications research", SPIE, Vol. 2038, p. 2, 1993;

[2] S. Hayes, C. Grebogi, and E. Ott, "Communicating with chaos", Phys. Rev. Lett., Vol. 70, p. 3031, 1993.

The chaos generator systems used for this purpose are electronic systems in which non-linearities are produced by diodes or by comparators having thresholds and hysteresis.

Chaos phenomena have also been studied on delayed differential optical systems having non-linear dynamics, using the light power of the signal as the dynamic optical variable.

In this respect, reference may be made to the following publications:

[3] P. Celka, "Chaotic synchronization and modulation of non-linear time-delayed feedback optical systems", IEEE Transactions on Circuits and Systems, Vol. 42, No. 8, p. 1, 1995;

[4] Takizawa, Liu, and Ohtsubo, "Chaos in a feedback Fabry-Perot interferometer", IEEE Journal of Quantum Electronics, Vol. 30, No. 2, p. 334, 1994.

SUMMARY OF THE INVENTION

The invention proposes an optical transmission system using chaos encrypting on the wavelength variable.

More particularly, the invention provides a system for transmitting an optical signal carrying information, the system comprising:

transmitter means for emitting an encrypted optical signal, said means comprising means for generating deterministic chaos and means for encoding the information-carrying signal by said deterministic chaos;

a line for conveying the signal encrypted in this way; and receiver means comprising means for generating deterministic chaos, and means for synchronizing said chaos with the received encrypted signal and for decrypting said encrypted signal;

characterized in that the chaos is wavelength chaos, the means for generating chaos including a wavelength tunable light source and a feedback loop for feeding the light signal output by said source back to the wavelength tuning control, said loop including means for non-linear wavelength conversion, and a delay line.

Such a system takes advantage of the dynamic characteristics of deterministic chaos, characteristics which are random overall while being entirely deterministic locally.

It will also be observed that such encrypting is adapted to high data rates.

The degree of confidentiality provided is sufficient to prevent a user having detection means that can be considered as being "ordinary" from managing to break the encrypting key given knowledge of the statistical properties of the chaos used for encoding.

The invention also provides transmitter and/or receiver apparatus for such a transmission system.

Other advantages and characteristics of the invention appear further from the following description. This description is purely illustrative and non-limiting. It should be read with reference to the accompanying drawings, in which:

DETAILED DESCRIPTION OF THE INVENTION

Figure 1:
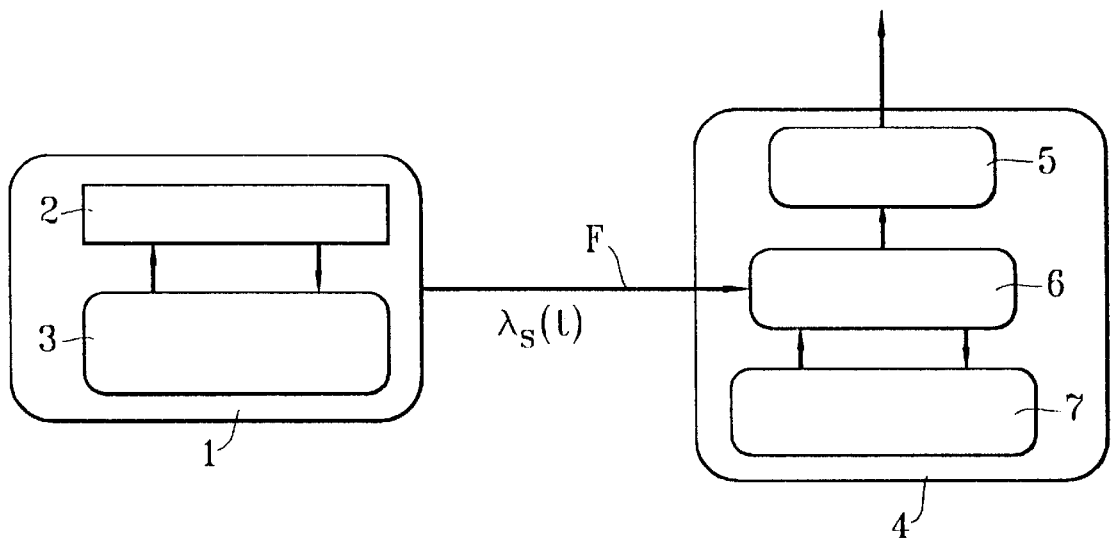
FIG. 1 is a block diagram showing a system constituting one possible embodiment of the invention.

In this specification, numbers used as reference characters in one figure that are the same in another figure refer to the same element.

The optical transmission system shown in FIG. 1 comprises transmitter means 1 and receiver means 4 between which the optical signal $\lambda_s(t)$ carrying encrypted information is conveyed by a fiber F.

The transmitter means 1 comprise a wavelength chaos generator 3 and an encoding system 2, serving to mix a data-carrying signal s(t) with the wavelength-chaotic signal generated thereby. Naturally, the signal s(t) may equally well be an analog signal or a binary signal.

The receiver means 4 comprise a chaos generator 7 that is completely or partially similar to the generator 3, means 6 for synchronizing local chaos with received chaos, and decoder means 5 that generally include means in common with the synchronization means 6.

The chaos generators 3 and 7 are light sources, controlled to emit a signal at a wavelength λ(t) that possess chaotic dynamic behavior. The value of the wavelength λ(t) varies between a wavelength $\lambda_1$ and a wavelength $\lambda_2$, e.g. corresponding to an optical bandwidth of the order of a few Ångströms.

Since the variations of λ(t) are chaotic, the signal has a white noise type spectrum in the frequency band usually used for transmitting data rates by optical telecommunications (in the range 100 Mbit/s to 10 Gbit/s).

The overall pseudo-random appearance that chaos gives to the wavelength λ(t) serves to encrypt the signal s(t).

Also, given that the dynamic characteristics of chaos are locally deterministic in time, the encrypted signal can be decoded providing the same deterministic dynamic is available on reception, i.e. from the elements constituting the wavelength chaos generator.

The wavelength varies over time (or which comes to the same thing, the wave numbers σ=1/λ vary over time), in a manner governed by a differential equation including a time delay and of the type:

$$\sum_{n=0}^{\infty} \alpha_n \frac{d^n}{(dt)^n} \sigma(t) = NL\{\sigma(t-T)\} \quad (1)$$

where:

$\alpha_n$ represents coefficients specific to the dynamic behavior of the system;

$d^n/(dt)^n$ represents the n-th derivative relative to time of the variable σ(t);

NL represents a non-linear function of the variable σ(t); and

T is a time delay.

Solutions to this equation are of the chaotic type: wave numbers a constituting solutions to this equation are pseudo-random; their frequency spectrum looks like that of white noise.

For example, when the derivatives of second and higher orders have zero coefficients, the above equation takes the form below, known as Ikeda's equation:

$$\sigma(t) + \tau \cdot \frac{d\sigma(t)}{dt} = NL\{\sigma(t-T)\} \quad (2)$$

where τ represents the time constant of the system.

The way in which the signal σ(t) varies over time is chaotic.

Figure 2:
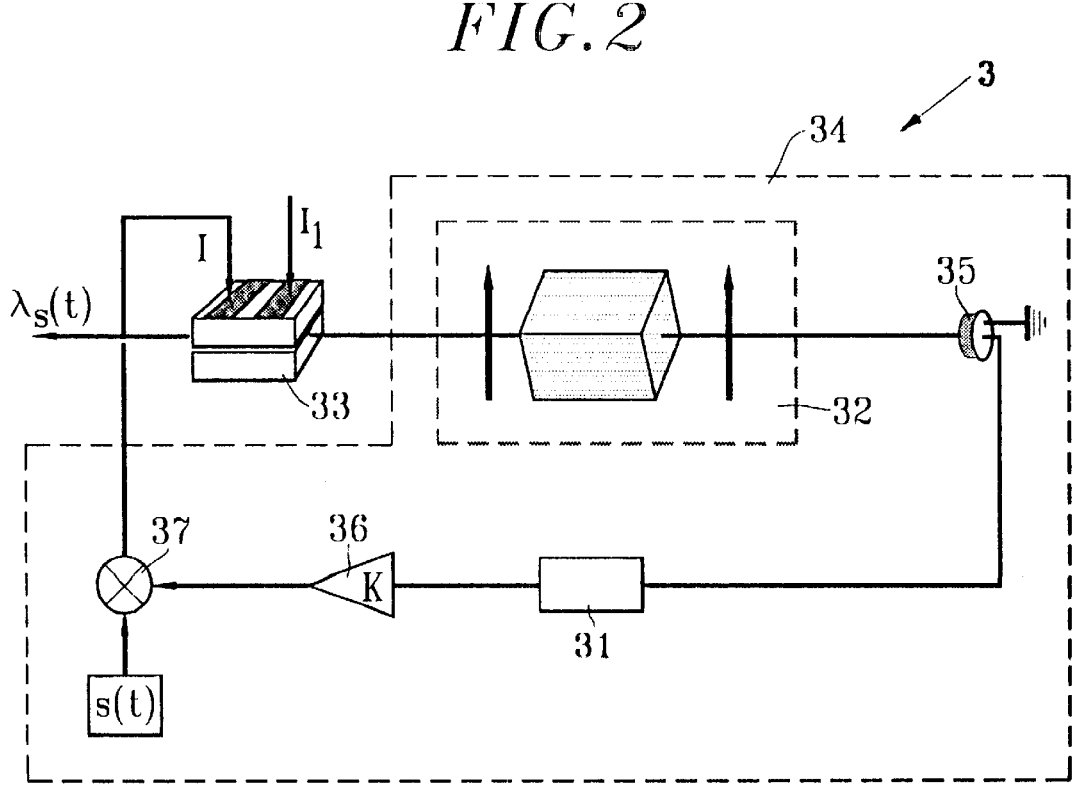
FIG. 2 shows a possible embodiment of a wavelength chaos generator.

The non-linear function NL{σ(t–T)} can be arbitrary. For example, and without this being limiting, FIG. 2 shows the case of a system in which the non-linear function is sinusoidal and is written:

$$NL\{\sigma(t-T)\}=\pi[A-\mu\sin^2\{M\cdot\sigma(t-T)\}] \quad (3)$$

The Ikeda model has been the subject of numerous studies. In this respect, reference may advantageously be made to the following publications:

[5] K. Ikeda, "Multiple-valued stationary state and its instability of the transmitted light by a ring cavity system", Opt. Commun., Vol. 30, No. 2, p. 257, 1979;

[6] F. A. Hopf, D. L. Kaplan, H. M. Gibbs, and R. L. Schoemaker, "Bifurcations to chaos in optical bistability", Phys. Rev. A, Vol. 25, No. 4, p. 2172, 1982.

According to that model, the wave number σ (σ=1/λ) emitted at an instant t obeys the following equation:

$$\sigma(t) + \tau \cdot \frac{d\sigma(t)}{dt} = NL[\sigma(t-T)] = \pi \cdot [A - \mu \cdot \sin^2\{M \cdot \sigma(t-T)\}]$$

where τ is the limiting time constant of the apparatus, T is a time delay that is at least twice as great as τ, A is a parameter specific to the system, μ is the bifurcation parameter, M is a parameter characteristic of the periodicity of the non-linearity which, for example, is of sinusoidal type. This parameter M is associated with the spectrum range ([$\lambda_1$, $\lambda_2$]) within which the wavelength λ(t) varies.

FIG. 2 shows a possible embodiment of the chaos generators 3 and 7.

The chaos generator shown in FIG. 2 comprises a wavelength tunable laser-emitting diode 33 together with an opto-electronic loop 34 for controlling said laser diode 33.

The laser diode 33 is a current controlled multisegment laser diode, e.g. of the DFB type. FIG. 2 shows two control electrodes for the diode 33, one for controlling its active layer (current $I_1$) and the other for controlling its wavelength offset (current I).

The loop 34 includes an optical element 32 that is non-linear in wavelength, having a beam emitted by the diode 33 passing therethrough and associated with a photodetector 35 receiving the optical signal output from the non-linear element 32.

The output current from the photodetector 35 is applied via a delay line 31 and an amplifier 36 to a control electrode of the emitting diode 33 through summing circuit 37.

The non-linear element 32 is an absorption or emission element having extrema as a function of wavelength, e.g. a birefringent filter, or a Mach-Zender or a Fabry-Perot interferometer, a two-wave interferometer, or a multiple wave interferometer.

Such an element has the advantage of making it possible to achieve non-linearity in very simple manner.

The light power $P_\lambda(t)$ output by said optical element 32 varies as a function of the input wavelength in application of a non-linear curve having an extremum.

Figure 3:
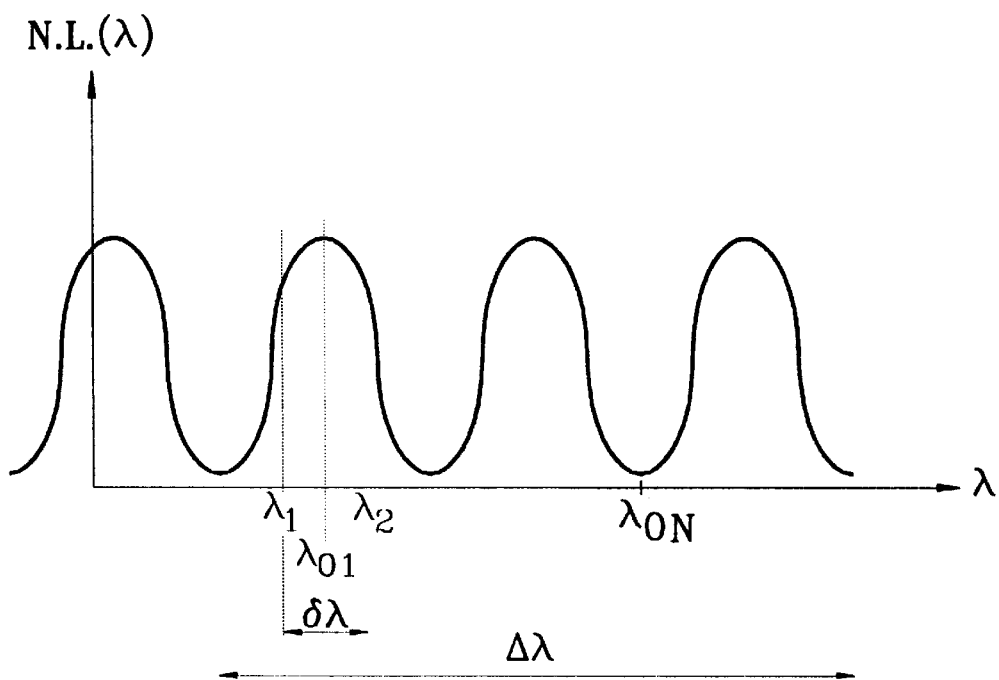
FIG. 3 is a graph showing an example of a non-linearity curve for the non-linear element of the FIG. 2 generator.

FIG. 3 shows an example of sinusoidal non-linearity in wavelength.

The wavelength tuning range of the laser source 33 covers a lobe of the non-linearity. For example, when the source 33 is a multisegment laser diode that is wavelength tunable over a spectral range that is 20 Å wide about $\lambda_0$=1.54 μm, then the non-linear element 32 can be a 10 mm optical delay birefringent filter (periodicity $2\pi(\lambda_0)^2$/M equal to 2.4 Å, lobe 1 Å approx.).

In the example shown in FIG. 2, the delay line 31 is of electronic type. It could equally well be implemented by means of a length of optical fiber situated between the laser diode 33 and the photodetector 35.

The time constant τ of the loop as described above depends on the slowest dynamic element in said loop, i.e. mainly on the reaction time of its electronics (τ=1 ns to 2 ns).

A condition for obtaining chaotic conditions is that T should be not less than 2τ. The dynamic frequency band of the chaos (coding noise) then typically covers a band of about 500 MHz. Any information signal to be mixed with such chaos must possess a Fourier spectrum within said band in order to be capable of being encrypted.

The signal s(t) carrying information can be mixed with the chaos by summing with one of the currents I and $I_1$. The loop in FIG. 2 is shown as including a summing circuit 37 whereby the photo-current output by the amplifier 36 is mixed with current carrying the signal s(t).

In another variant, the signal s(t) can be mixed with the chaos by modulating the non-linear characteristic of the element 32, e.g. by applying an electric field thereto so as to displace the position of the maximum in the curve of non-linearity.

In another variant, mixing can be performed by modulating the gain K of the amplifier 36.

Figure 4:
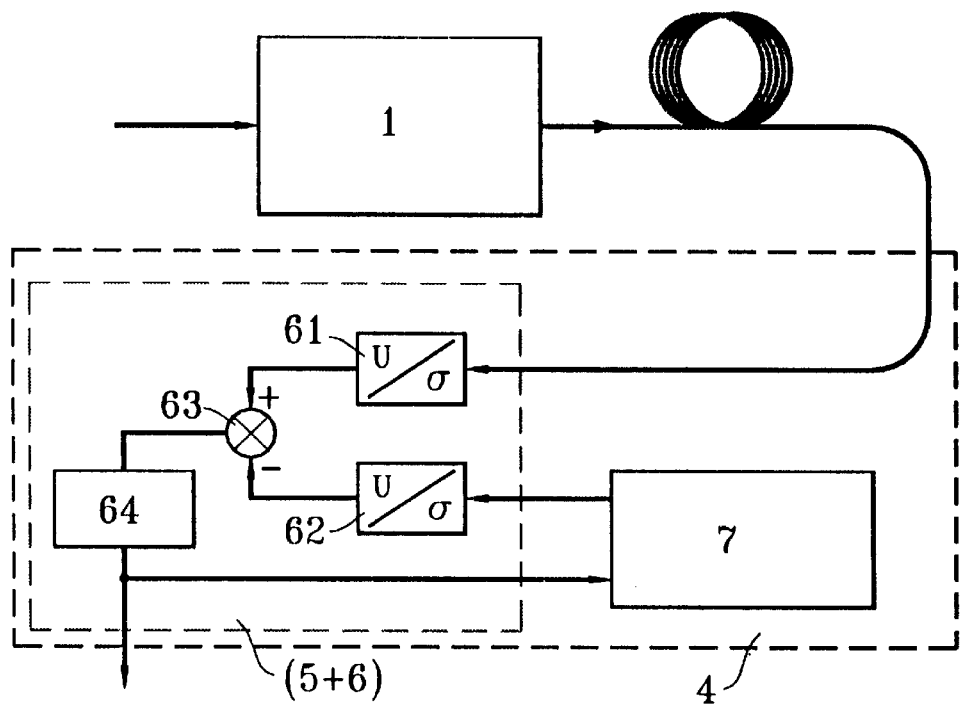
FIG. 4 shows a possible embodiment of the receiver means in the transmission system of FIG. 1.

FIG. 4 shows a possible embodiment of receiver means 4 for receiving the signal output by the transmitter means of FIG. 2.

The wavelength chaos $\lambda_s(t)$ containing the encoded signal is compared with chaos coming from the local chaos generator 7.

To this end, the receiver means 4 include two wavelength-to-voltage converters 61 and 62 which respectively convert the signal $\lambda_s(t)$ and the signal generated by the chaos generator 7 into voltage signals.

These voltages are mixed in an electronic subtracter 63. This delivers an error signal which, after amplification by the regulator block 64 is injected into the local chaos generator 7 to maintain synchronism with the chaotic signal $\lambda_s(t)$.

The local chaos generator 7 is identical to the generator 3 shown in FIG. 2. The error signal is applied to the generator 7 at the point where the chaos signal and the encoded signal are mixed in the generator 3 (e.g. at the summing circuit 37 of FIG. 2).

The wavelength-to-voltage converters 61 and 62 may be constituted, for example, by optical filters having transmission that is linear as a function of wavelength.

Figure 5:
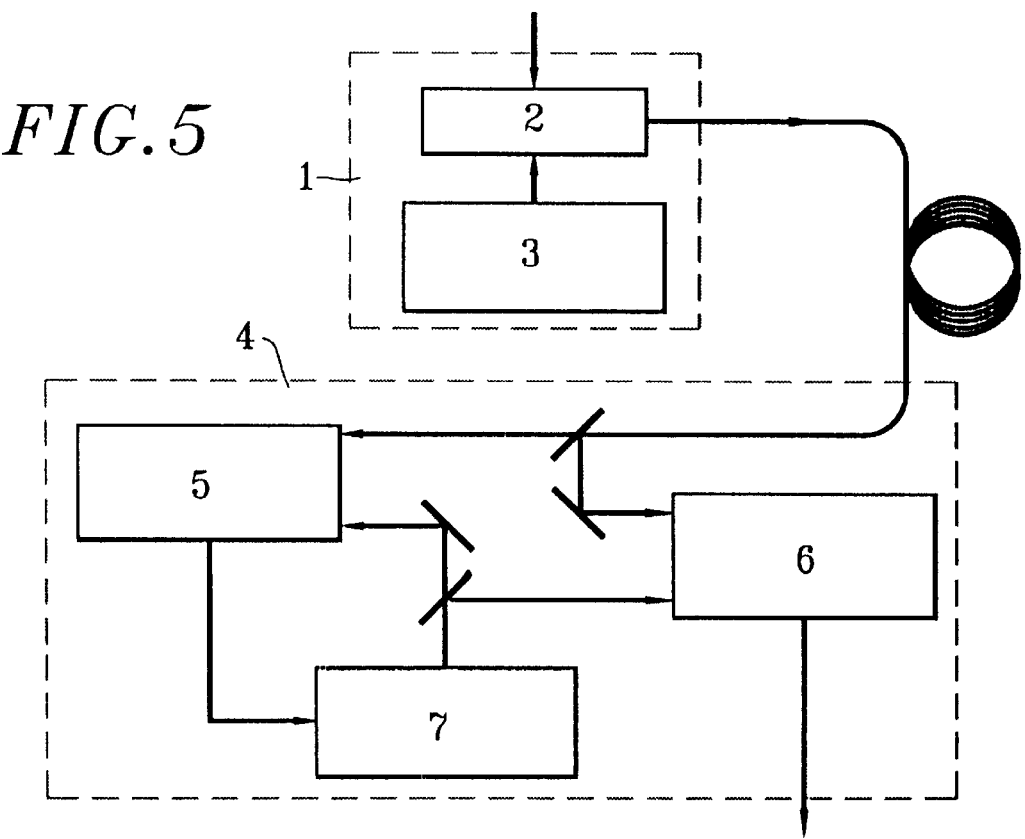
FIG. 5 is a diagram of a transmission system constituting a possible embodiment of the invention, and implementing phase modulation of a wavelength-chaotic signal.

In another variant, as shown in FIG. 5, the signal s(t) can be superposed on the chaos by phase modulating the wavelength chaos signal $\lambda(t)$ emitted by the generator 3.

The chaos signal output from the generator 3 is applied for this purpose to a phase modulator 2 where the signal s(t) is applied to the wavelength chaos.

The receiver means 4 are then constituted by detector means that operate by optical heterodyning. They comprise a synchronization module 5 and a local chaos generator 7 identical to those of FIG. 4.

They also include optical heterodyning means 6 that have inputs receiving both the optical signal corresponding to the transmitted chaos as phase modulated by s(t), and the synchronous local wavelength chaos from the generator 7.

These heterodyning means restore the signal s(t).

Figure 6:
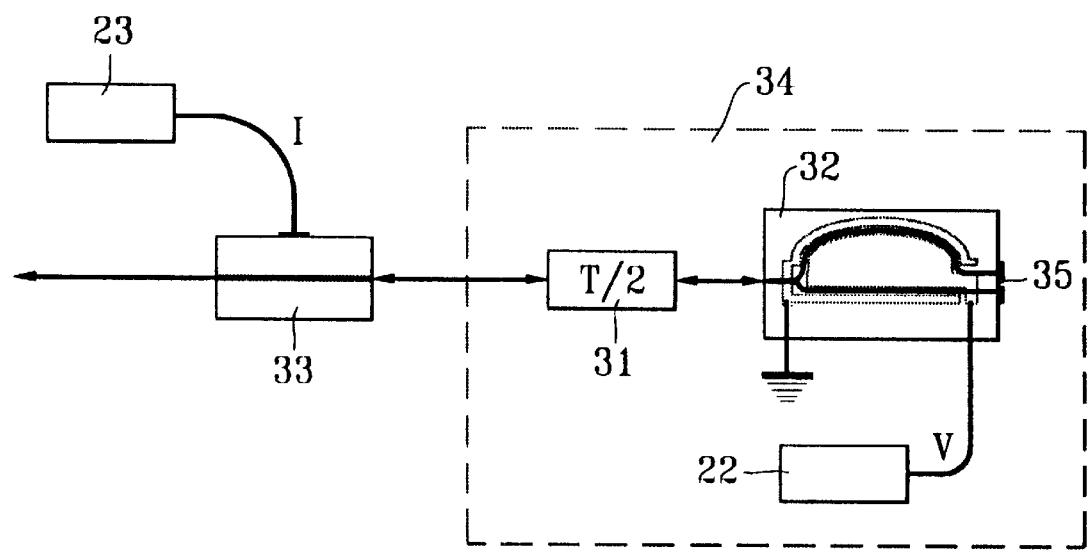
FIG. 6 shows another possible embodiment of a wavelength chaos generator.

Reference is now made to FIG. 6 showing another variant of a possible chaos generator for the invention.

The generator shown in this figure is an all-optical chaos generator that can be used instead of the generator of FIG. 2.

It comprises a wavelength tunable laser diode 33 connected by an optical fiber 31 used as a delay line of delay T to a Mach-Zender interferometer 32 terminated at its end remote from the fiber 31 by a reflecting face 35.

The emission wavelength $\lambda(t)$ output by the diode 33 is a function of the intensity $I_\lambda(t)$ of the light beam input to said diode, which corresponds to that as initially emitted, but after passing through the optical non-linearity 32 constituted by the Mach-Zender interferometer and after being delayed by the delay line 31 of optical feedback loop 34.

The Mach-Zender interferometer 32 constitutes the element that is not linear in wavelength.

The signal s(t) can be mixed with the chaos either by modulating the control current of the laser diode 33 with control current modulator 23 or by modulating the control voltage of the Mach-Zender interferometer 33 with control voltage modulator 22.

The advantage of this all-optical chaos generator lies in its very short time constants ($\approx$10 ps) and thus its capacity to encode signals at very high data rates (10 GHz).

Figure 7:
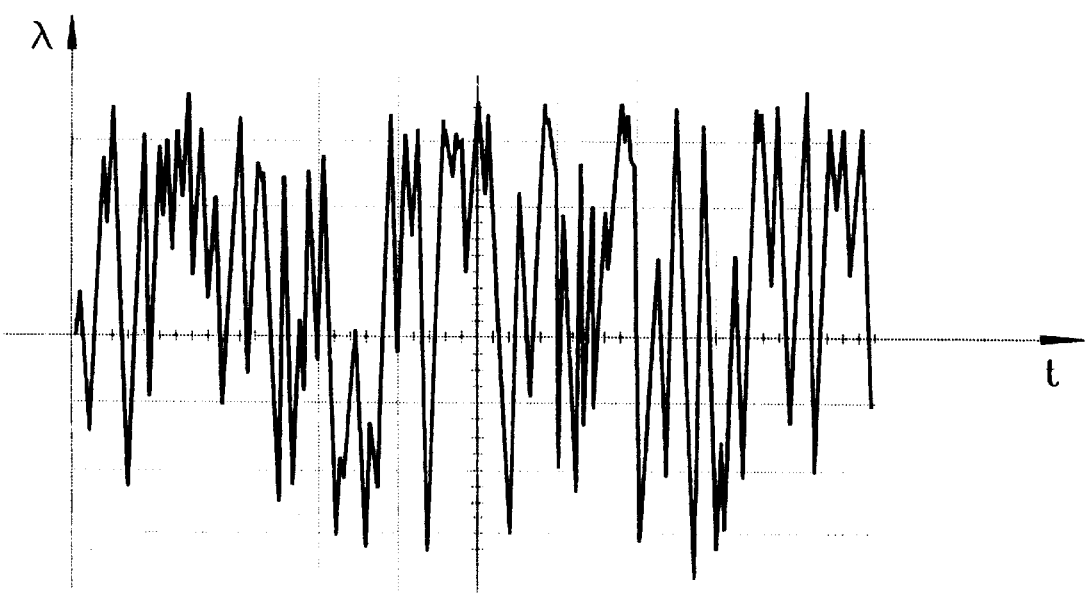
FIG. 7 is a graph showing an example of wavelength chaos as a function of time; and finally

FIG. 7 shows an example of wavelength chaos as can be obtained using a generator as shown in FIG. 2 or FIG. 5.

The graph of the non-linearity of FIG. 3 shows the possible locations where said chaos takes place. They can be situated either on the concave portion of a non-linearity lobe, or on the convex portion thereof.

As a general rule, the total tuning range $\Delta\lambda$ of a multi-segment laser is much greater than the width $\delta\lambda=\lambda_2-\lambda_1$ of a non-linearity lobe.

It is therefore possible to perform encoding on a plurality of channels, giving each channel its own tuning range lobe. Each channel is then centered on a given wavelength $\lambda_{01}$, $\lambda_{02}, \ldots, \lambda_{0n}$.

Figure 8:
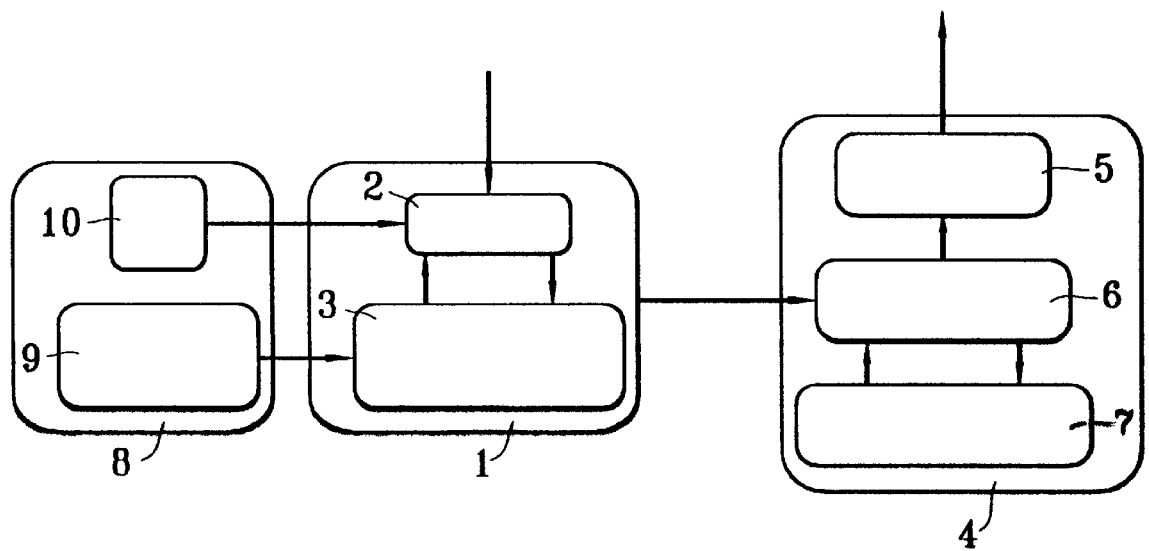
FIG. 8 shows a multichannel transmission system of the invention.

FIG. 8 is a diagram showing a system for multichannel encoding by wavelength chaos.

The system includes a transmitter system 1 as described above, driven by a unit 8 for controlling multichannel wavelength encrypting.

The unit 8 serves to modify the operating points of the system 1, i.e. firstly to modify the center wavelength of the emission chaos ($\lambda_{0k}$), and secondly to modify the encrypting key.

To this end, it includes a wavelength switch 9 which delivers various current levels to the electrodes of the diode 33 of the chaos generator shown in FIG. 2. These currents switch the center wavelength about which the chaos varies.

The unit 8 also includes a key switch 10 controlling one of the elements of the control loop of the laser diode 33 so as to modify one of the chaos parameters, and thus the encrypting key, as a function of the channel used. For example, the unit 10 may vary the gain K of the amplifier 36 as a function of the channel used. It may also vary the non-linearity of the non-linear element 32, e.g. by a thermal effect, an electro-optical effect, a piezoelectric effect, or an optical effect.

Naturally, it is also possible to provide means for modifying the encrypting key for a single channel transmission system.

It will be observed that the above-described transmission system does not require the receiver to lock onto the absolute value of the emitted wavelength, but only onto the relative variation thereof. This gives rise to highly flexible decoding, for the purpose of selecting one or another of the encoded channels, naturally providing the encoding key is known (i.e. which elements, and what parameters for said elements).

What is claimed is:

1. A system for transmitting an optical signal carrying information, the system comprising:

transmitter means (1) for emitting an encrypted optical signal, said means comprising means (3) for generating deterministic chaos and means (2) for encoding the information carrying signal by said deterministic chaos;

a line (F) for conveying the signal encrypted in this way; and receiver means (4) comprising means (7) for generating deterministic chaos, and means (5, 6) for synchronizing said chaos with the received encrypted signal and for decrypting said encrypted signal;

wherein the chaos is wavelength chaos, the means (3, 7) for generating chaos including a wavelength tunable light source (33) and a feedback loop (34) for feeding the light signal output by said source back to the wavelength tuning control, said loop (34) including means (32) for non-linear wavelength conversion, and a delay line (31).

2. The system of claim 1, wherein the light source (33) is one of (i) controlled by an electrical parameter where feedback loop (34) is optoelectronic, and (ii) optical where feedback loon (34) is optical.

3. The system of claim 2, wherein the non-linear means (32) is an optical element having extrema as a function of wavelength, wherein the optical element is at least one of a two-wave interferometer, a Mach-Zender interferometer, a Fabry-Perot interferometer, a birefringenet crystal, and a multiple wavelength interferometer.

4. The system of claim 1, wherein the encoding means includes means (37) for mixing the information-carrying signal with the signal propagating in the feedback loop (34) to produce chaos $\lambda_s(t)$ containing the signal to be transmitted.

5. The system of claim 1, wherein the encoding means (2) includes a phase modulator adapted to phase modulate the emitted wavelength chaos by the information-carrying signal.

6. The system of claim 4, wherein the transmitter means for generating chaos (3) and receiver means for generating chaos (7) are identical.

7. The system of claim 2, wherein both the transmitter means and receiver means include means for modifying the parameters of the feedback loop (34), thereby modifying the encrypting key, wherein the means for modifying the parameters of the feedback loop (34) includes at least one of (i) means for modifying the non-linearity of the conversion means and (ii) means for modifying the value of the delay.

8. The system of claim 1, further comprising:

an encrypting control unit (8) including a key switch (10) coupled to the means (2) for encoding the information carrying signal and a wavelength switch (9) coupled to the means (3) for generating deterministic chaos.

9. A communication device for a transmission system, comprising:

wavelength chaos generator means, said means including a wavelength tunable light source having a light signal and a wavelength tuning control electrode; and a loop for feedback of the light signal output by said source to the wavelength tuning control electrode, said loop including non-linear conversion means for the wavelength coupled to a delay line.

10. An optical transmission system implementing encrypting of an information carrying signal by deterministic chaos, the system comprising:

a transmitter (1) having a deterministic chaos generator (3) coupled to an encoding system (2), the deterministic chaos generator (3) including a wavelength tunable laser-emitting diode (33) and an opto-electronic feedback loop (34), the wavelength tunable laser-emitting diode (33) having a first electrode for active layer control, a second electrode, a first output for outputting a chaotic signal having a wavelength $\lambda_s(t)$, and a second output, the opto-electronic feedback loop (34) having an optical element (32) coupled to the second output of the wavelength tunable laser-emitting diode (33) and a delay line (31) coupled between the optical element (32) and a second electrode of the wavelength tunable laser-emitting diode (33) as wavelength offset control;

a receiver (4) having a deterministic chaos generator (7) coupled to a synchronizer (6) and a decoder coupled to the synchronizer (6); and one transmission channel coupled between the transmitter (1) and the synchronizer (6) of the receiver (4).

11. The system of claim 10, wherein the one transmission channel is a high speed transmission channel.

12. The system of claim 11, wherein the one transmission channel is a fiber optic cable.

13. The system of claim 10, wherein the deterministic chaos generator (3) and the deterministic chaos generator (7) include the same structure.

14. A method for transmitting a data-carrying signal s(t) encrypted by deterministic chaos as coding noise, the method comprising:

generating a chaotic signal in a chaos generator (3), the chaotic signal having a wavelength $\lambda_2(t)$ that demonstrates chaotic dynamic behavior that is locally deterministic in time;

mixing the data-carrying signal s(t) with the wavelength chaotic signal in an encoding system (2) coupled to the deterministic chaos generator (3) to produce a mixed signal having transmitted chaos;

transmitting the mixed signal over one transmission channel coupled to the transmitter (1);

receiving the mixed signal from the one transmission channel at a receiver (4) having receiving chaos generated in a chaos generator (7);

synchronizing receiving chaos with transmitted chaos at a synchronizer (6) coupled to chaos generator (7); and decoding the mixed signal at a decoder (5) coupled to the synchronizer (6).

15. The method of claim 14, wherein the chaotic signal presents a white noise frequency spectrum having a frequency band that ranges between 100 Mbit/s and 10 Gbit/s.

* * * * *

UNITED STATES PATENT AND TRADEMARK OFFICE
CERTIFICATE OF CORRECTION

PATENT NO.    : 6,018,582
DATED         : January 25, 2000
INVENTOR(S)   : Francois et al.

It is certified that error appears in the above-identified patent and that said Letters Patent is hereby corrected as shown below:

Column 3,
Line 39, delete "numbers a consituting" and insert -- numbers $\sigma$ constituting --.

Column 6,
Line 6, delete "interferometer 33 with" and insert -- interferometer 32 with --.

Column 7,
Line 14, delete "feedback loon" and insert -- feedback loop --.
Line 30, delete "system of claim 4" and insert -- system of claim 5 --.

Signed and Sealed this

Twenty-first Day of August, 2001

*Attest:*

*Nicholas P. Godici*

NICHOLAS P. GODICI
*Attesting Officer*   *Acting Director of the United States Patent and Trademark Office*